B. T. CARSON.
TOOL HOLDER.
APPLICATION FILED MAR. 9, 1920.
1,382,413.
Patented June 21, 1921.
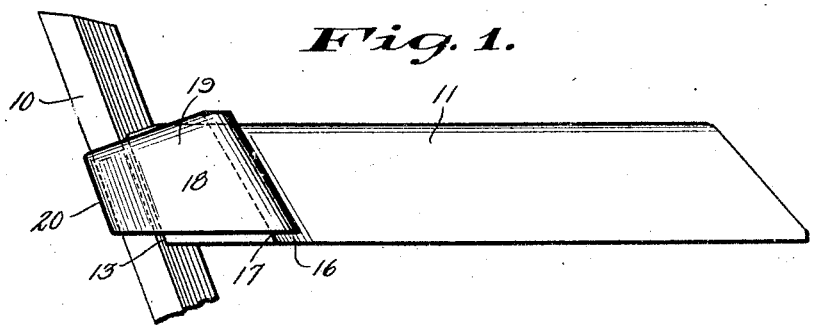
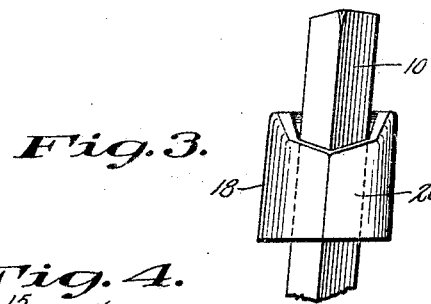
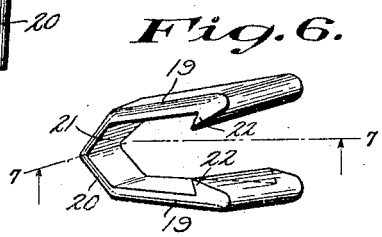
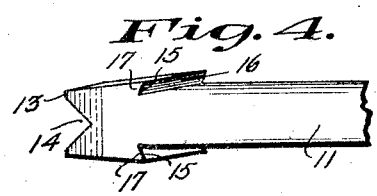
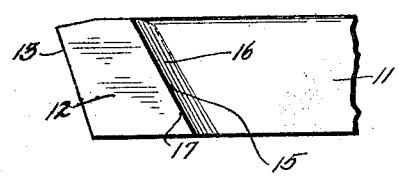
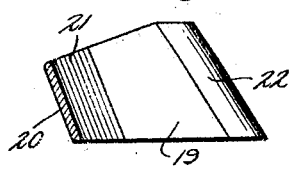
WITNESSES
INVENTOR
BENJAMIN T. CARSON,
BY
ATTORNEYS

UNITED STATES PATENT OFFICE.

BENJAMIN THOMAS CARSON, OF RENSSELAER, NEW YORK.

TOOL-HOLDER.

1,382,413.  Specification of Letters Patent.  Patented June 21, 1921.

Application filed March 9, 1920. Serial No. 364,406.

*To all whom it may concern:*

Be it known that I, BENJAMIN T. CARSON, a citizen of the United States, and resident of Rensselaer, in the county of Rensselaer and State of New York, have invented a new and Improved Tool-Holder, of which the following is a full, clear, and exact description.

This invention relates to lathe tools, and more particularly to an improvement in a tool holder.

In the construction of tool holders now in general use and on the market, use is made of a shank which varies in form and construction according to the use of the tool and said shank is usually provided with a socket or groove which is designed to receive the tool and screws or bolts adapted to co-act with the socket and tool to retain same in place.

It is therefore one of the principal objects of the present invention to simplify the means for associating a tool with a tool supporting shank which means eliminates the use of fastening devices such as screws or bolts.

Another object of the invention is to provide a means for associating a tool with a tool supporting shank which is adjustable to accommodate tools of varying sizes and which when adjusted will rigidly clamp the tool in such a manner as to eliminate any possibility of the same becoming disarranged from its set position.

A still further object of the invention is to provide a tool holder with which a tool may be readily associated or easily removed without the use of screw drivers, monkey wrenches or other implements of this nature.

With these and other objects in view, which will be more readily apparent hereafter, reference is made to the following description, claims and accompanying drawings forming a part of this application and in which—

Figure 1 is a side elevation of the improved tool holder illustrating a tool arranged in position therein.

Fig. 2 is a plan view thereof.

Fig. 3 is an end view.

Fig. 4 is a fragmentary plan view of the shank with the yoke removed.

Fig. 5 is a side elevation of the same.

Fig. 6 is a plan view of the yoke removed from the shank.

Fig. 7 is a sectional view taken approximately on the line 7—7 of Fig. 6.

Referring to the drawings by characters of reference which denote like parts throughout the several views thereof, 10 designates a tool which is here illustrated as the "diamond point" type and 11 the shank of the tool holder which is preferably of rectangular formation in cross section and is provided at one extremity with a head 12 which is preferably formed integral therewith. The outer end wall 13 is inclined and provided with a vertically arranged V-shaped groove 14. The rear edges 15 of the head which are preferably formed by the vertical grooves 16 cut in the opposite side faces of the shank are disposed at an angle to the inclined outer end wall 13 of the head. The juncture of the head with the body portion of the shank provides shoulders 17 which are preferably beveled slightly toward the outer end wall. The yoke 18 which is adapted to be associated with the head of the shank for securing the tool 10 in place and clamping the same against the end wall is preferably of U-shaped formation and comprises side arms or legs 19 and a connecting portion or bight 20, the inner face of which is grooved as at 21. As illustrated the free extremities of the legs 19 are each provided with an inwardly extending flange 22 constituting a shoulder which is disposed at an angle with respect to the bight 20. The angularity of the flanges 22 is substantially identical to that of the shoulders 17 formed on the shank head and the inclination of the bight 20 conforms to and is substantially identical with the inclination of the end wall 13.

In use of the tool holder, the yoke is applied to the head of the shank with the legs 19 straddling the same and the inner edges of the flanges 22 in engagement with the shoulders 17. It will be understood that upon vertical sliding movement of the yoke the bight 20 will be moved toward or away from the end wall 13 to increase or decrease the size of the socket formed by the end wall 13 and the bight. The configuration of the grooves 21 and 14 may be varied to conform to the shape of the tool which it is desired to receive. By reference to Fig. 1 of the drawing it will be seen that as the yoke is moved downwardly, the co-acting engagement of the shoulders 17 and the flanges 22 will serve to effect relative movement of the bight of the yoke toward the end wall 13 whereby to clamp the tool against said end wall. A reverse movement of the yoke will move the bight 20 away from the end wall to permit of the removal of the tool. Likewise the movement of the yoke and the resulting relative movement of the bight toward or away from the end wall will serve to increase or decrease the socket which is formed by the end wall and the bight to accommodate tools of varying cross sectional dimensions.

While there has been illustrated and described a single and preferred embodiment of the invention, it is to be understood that the same is merely illustrative of one way in which the device may be reduced to practice and no limitation is made to the precise details of construction as modifications and variations which fall within the scope of the appended claims may be resorted to when found expedient.

Having thus described my invention, what I claim as new and desire to secure by Letters Patent; is,

1. In a tool holder, a shank, an angular outer end provided with a vertical groove, a yoke member adapted to be supported from said end of the shank to constitute a tool receiving socket, and means formed respectively on the yoke and the side faces of said end of the shank adapted to co-act upon relative vertical adjustments to vary the size of the tool receiving socket.

2. In a tool holder, a shank and means for clamping a tool to one end thereof, comprising wedge-shaped portions formed on opposite sides of the shank adjacent one end thereof and a yoke having wedge-shaped portions adapted to co-act with the wedge-shaped portions on the shank whereby upon vertical adjustments of the yoke, the bight of the same will be advanced toward or away from the end of the shank.

3. A tool holder comprising a shank having portions formed on the opposite sides thereof disposed at an angle to its terminal, a member having a bight and side legs adapted to straddle the shank, opposed portions on the inner side of the legs disposed at an angle to the bight and adapted to co-act with the portions of the shank to effect relative movements of the bight and the shank upon vertical adjustment of the member.

4. In a tool holder, a shank, a head formed at one end thereof having diverging inner and outer end walls, a yoke having a bight and parallel side arms, inwardly extending flanges disposed at an angle to the bight, said flanges adapted to co-act with the inner walls of the head upon relative vertical adjustment to clamp a tool embraced by the closed end of the yoke against the outer end of the head.

5. A tool support including a shank and means for clamping a tool to one end of the same, comprising portions on the opposite sides of the shank disposed at an angle to its end, a member adapted to embrace a tool and said shank end, and means on the member adapted to engage and co-act with the angularly disposed portions whereby upon relative movement of said means with respect to said portions the tool will be clamped against the said shank end.

6. In a tool holder, a shank, vertical shoulders formed on the opposite sides thereof and angularly disposed with respect to the end of said shank, a clamp member having a closed end, parallel side arms, and vertical shoulders formed on the inner side of each arm and disposed at an angle to the closed end, the shoulders on the clamp member adapted to engage with the shoulders on the shank whereby upon vertical adjustment of the clamp the shoulders will co-act to effect relative movement of the shank end and the closed end of the clamp to provide adjustable tool receiving jaws.

7. A tool holder comprising a shank, an integral head formed at one end of the shank, the juncture of the head with the shank forming shoulders disposed at an angle with respect to the outer end of the head, a member having parallel side arms, a bight and opposed flanges formed on and projecting inwardly from the inner side of the arms and disposed at an angle to the bight, the legs of said member adapted to straddle the head and the flanges thereon adapted to engage and co-act with the shoulders whereby to arrange the bight parallel to the outer end of the head, vertical movements of the member with respect to the head serving to adjust the bight toward and away from the end of the head.

8. In a tool holder, a shank, a tool seat at the forward end of the shank, a clamping device having means to engage the tool opposite the tool seat, and a complementary sliding connection between the shank and clamping device, said sliding connection inclined with relation to the tool seat.

9. In a tool holder, a shank, a tool seat at the forward end of the shank, a clamping yoke, complementary engaging shoulders between the yoke and shank, said shoulders being relatively inclined to the tool seat.

BENJAMIN THOMAS CARSON.